United States Patent [19]

Merzhanov et al.

[11] Patent Number: 5,032,370
[45] Date of Patent: Jul. 16, 1991

[54] METHOD OF PREPARING SILICON NITRIDE WITH A HIGH ALPHA-PHASE CONTENT

[76] Inventors: Alexandr G. Merzhanov; Inna P. Borovinskaya, both of ulitsa Tretya, 3,kv.2, Moskovskaya oblast,poselok Chernogolovka; Leonid S. Popov, ulitsa 13 Parkovaya,27,korpus 1,kv.182, Moscow; Nikolai S. Makhonin, Institutsky prospekt, 8,kv. 139; Lidia V. Kustova, ulitsa Pervaya, 23, kv.35, both of Moskovskaya oblast, Chernogolovka poselok, all of U.S.S.R.

[21] Appl. No.: 457,825
[22] PCT Filed: Apr. 3, 1989
[86] PCT No.: PCT/SU89/00086
  § 371 Date: Jan. 12, 1990
  § 102(e) Date: Jan. 12, 1990
[87] PCT Pub. No.: WO89/11447
  PCT Pub. Date: Nov. 30, 1989

[30] Foreign Application Priority Data

May 24, 1988 [SU] U.S.S.R. ............................ 4422423

[51] Int. Cl.$^5$ .................. C01B 21/06; C01B 33/06
[52] U.S. Cl. ........................................ 423/344; 264/65
[58] Field of Search ..................... 423/344; 264/65

[56] References Cited

U.S. PATENT DOCUMENTS 3,726,643 4/1973 Merzhanov et al. ............ 423/344

FOREIGN PATENT DOCUMENTS 0063272 10/1982 European Pat. Off. ......... 423/344
441701   1/1969  Japan ............................ 423/344
0084108  5/1983  Japan ............................ 423/344
3170202  7/1988  Japan ............................ 423/344

Primary Examiner—Olik Chaudhuri
Assistant Examiner—Ken Horton
Attorney, Agent, or Firm—Burgess, Ryan and Wayne

[57] ABSTRACT

The invention relates to preparing refractory inorganic compounds, particularly, to methods of preparing silicon nitride with a high $\alpha$-phase content.

The method of preparing silicon nitride with a high $\alpha$-phase content is accomplished by means of self-propagating high-temperature synthesis. The method includes contacting the charge containing a silicon-reagent with an additive in a nitrating medium. The silicon-reagent is metallic silicon and at least one ammonium halide is used as an additive in the amount of 1–60% of the mass of metallic silicon. The synthesis is carried out at a pressure of 4–30 MPa.

13 Claims, No Drawings

METHOD OF PREPARING SILICON NITRIDE WITH A HIGH ALPHA-PHASE CONTENT

FIELD OF THE INVENTION

The present invention relates to preparing refractory inorganic compounds and, more particularly, to methods of preparing silicon nitride with a high α-phase content.

Due to unique physical and mechanical properties (high hardness, sufficient strength and wear resistance, thermal stability, extremely low thermal expansion coefficient, inactivity in many aggressive media, low friction coefficient, low density, specific semiconducting and dielectric properties), silicon nitride finds application for manufacturing ceramic materials used for various purposes.

These construction high-temperature materials, refractories, antifriction and tool materials, special materials with a high electric strength and stable dielectric properties within a wide range of conditions, with heat-insulating and heat-conducting properties are widely used in engineering, tool industry, metallurgy, rocket engineering, electronics, electrical and radio engineering, and in other branches of industry.

BACKGROUND OF THE INVENTION

To prepare silicon nitride powders on industrial scale, various methods of direct synthesis have found wide application since initial materials are readily available.

Known methods of direct synthesis of silicon nitride powder via the nitration reaction can be divided into traditional methods of furnace synthesis widely used in industry and a promising relatively new plasmochemical method and a method of self-propagating high-temperature synthesis (SHS) in the combustion regime.

The method of furnace synthesis of silicon nitride powders is based on nitration of elemental silicon powder upon heating in electric furnaces in a flow of nitrogen or nitrogen-containing gas. Nitration of silicon dioxide in a mixture with a reducer, mainly, carbon, is one of the versions of the known method.

Methods of silicon nitration in furnaces are predominantly two-stage and their accomplishment requires much time. The first stage of silicon powder nitration is carried out at a temperature by 100°–250° C. below the melting point of silicon and up to the attainment of 30–40% degree of bonding silicon to nitrogen. This stage requires from 3–5 hrs to 10–20 hrs. At the second stage complete nitration is performed at 1500°–1600° C.

Known in the art is the most effective and rather simple method of preparing silicon nitride powder with a high content of α-phase by the furnace synthesis method. The method resides in nitration of metallic silicon in a flow of a nitrogen-containing gas under a reduced nitrogen partial pressure for 4–5 hrs upon heating in furnaces at 1200°–1400° C., the nitrogen partial pressure being maintained equal to ∼0.5 atm (0.05 MPa) as long as 50–60% by mass of silicon is reacted. The method provides the content of α-phase in the silicon nitride powder equal to 97% by mass.

The use of the known method for preparing silicon nitride requires a strict control over temperature, nitrogen partial pressure, and a gas flow rate in the course of the whole nitration process in order to maintain the thermal conditions required for the formation of α-phase and to compensate the exothermal effect of the nitration reaction with the aid of heat removal. Besides, this method demands rather great power consumption for attaining 1200°–1400° C. in the electric furnaces at which the nitration process takes place.

The method of plasmochemical synthesis, namely, nitration of silicon in a low-temperature nitrogen plasma, is of interest for preparing ultrafine silicon nitride powders possessing good caking ability.

Known in the art is a plasmochemical method of preparing silicon nitride by nitration of silicon in a nitrogen plasma produced by a high-frequency generator with the use of 98.9% pure silicon and nitrogen of a high purity (Izd. Akad. Nauk SSSR, ser. Neorganocheskie materialy, Moscow, 1979, Vol. 15, No.4. G. M. Kheidemans, Ya. P.Grabas and T. A. Miller "High-temperature synthesis of finely dispersed silicon nitride", pp. 595–598).

Silicon nitride powder prepared by the above method is a mixture of α and β phases and contains 2–4% by mass of free silicon and up to 5% by mass of oxygen. In addition, plasmochemical powders of silicon nitride possess an enhanced chemical activity as compared with powders obtained by other methods and are readily hydrolyzed in humid air which requires certain measures upon storage and processing.

Thus, although plasmochemical powders possess a tendency to cake, the quality of these powders does not allow one to use them for preparing ceramic materials with high physical and mechanical properties.

Besides, the accomplishment of the plasmochemical synthesis, as well as that of the furnace synthesis, demands great power consumption.

The method of self-propagating high-temperature synthesis (in the combustion regime) (U.S. Pat. A, No. 3726643) is the most promising one for direct synthesis of silicon nitride with respect to the purity and quality of the prepared product, efficiency and energy-intensity of the process.

The method is based on the use of heat liberated upon exothermal interaction of the reagents at least one of which is in a condensed state. The method resides in local initiation of a chemical reaction in a layer of the reaction mixture and in a subsequent interaction of the reagents in the combustion regime, i.e. self-propagation of the combustion front at the expense of layer-by-layer self-heating of the reaction mixture due to sufficient exothermal effect of the reaction.

A great thermal effect of the reaction of silicon with nitrogen (180 kcal/mole) makes it possible to carry out the process of silicon nitration in the combustion mode, i.e. by the method of self-propagating high-temperature synthesis (SHS).

Moreover, the exothermic effect of the reaction of silicon with nitrogen is so high that the combustion temperature must be decreased in order to maintain the temperature preferable for the formation of α-phase of silicon nitride.

To decrease the combustion temperature, the initial powderous mixture of the reagents is diluted to 50% by mass with the final product.

Silicon nitride with a high content of α-phase was prepared by the method of self-propagating high-temperature synthesis with dilution of the initial powderous mixture by the final product (J.Am. Ceram. Soc., 1986, Vol. 69, No. 4; Kiyoshi Hirao, Yoshinary Miyamoto, Mitsue Koizume "Synthesis of silicon nitride by a combustion reaction under high nitrogen pressure", pp. 60–61).

The method resides in preparing an initial powderous mixture (charge) from silicon powder (99.9% pure) with a dispersity of ≲5 mkm and silicon α-nitride powder (98% of α-Si$_3$N$_4$) with a dispersity of ~0.1 mkm at a mass ratio of 47.4 and 52.6% respectively, grinding the charge components to a dispersity of ~0.2 mkm, mixing in acetone, drying the charge in a vacuum, molding the cylinders 6 mm in diameter and 10 mm long with a density of 44-46% of theory, and performing the synthesis in the combustion mode under 10 MPa after local initiation of the reaction in a charge layer with a 3 s electric pulse.

The synthesis in the combustion mode yielded silicon nitride with 87% by mass of α-phase.

Thus, the preparation of silicon nitride with a high content of α-phase requires the use of silicon nitride with almost a 100% content of α-phase in amount of 50% of the initial charge mass as an inert component in making the initial charge.

SUMMARY OF THE INVENTION

It is an object of the invention to provide a method of preparing silicon nitride with a high α-phase content which will ensure the preparation of the final product without using scarce material.

This object is accomplished by a method of preparing silicon nitride with a high α-phase content using self-propagating high-temperature synthesis including the contact of the charge containing silicon-reagent and an additive with a nitrating medium under an increased pressure. According to the invention, metallic silicon is used as silicon-reagent and as an additive use is made of at least one ammonium halides in amount of 1-60% of the mass of silicon-reagent and self-propagating high-temperature synthesis is carried out under a pressure of 4-30 MPa. The pressure of the nitrating medium below 4 MPa results in a decrease of the silicon nitride yield due to the reduction of the nitration degree of silicon.

The pressure of the nitrating medium above 30 MPa is inexpedient since a further pressure rise does not further increase the silicon nitration degree.

The additives to the charge proposed in the method plays a double role in the course of the synthesis. Firstly, they are the diluting agent of the charge, i.e. they decrease the combustion temperature, thereby providing a temperature regime favourable for the formation of α-phase.

If the content of the additives is less than 1% by mass there is a rise of the temperature of combustion and dissociation of the final product, i.e. increases the lower critical combustion limit.

If the content of the additives is more than 60% by mass there is an increase in the upper critical combustion limit in the given system (i.e. the combustion becomes impossible).

Secondly, these additives are not inert in the process of self-propagating high-temperature synthesis. Being gasified in the combustion front, they form with silicon intermediate products which later favour the formation of silicon α-nitride in the recombustion region.

For this purpose, an ammonium halide or a mixture of ammonium halides is used as an additive to the charge.

Ammonium fluoride, chloride or iodide, or mixtures thereof in any ratios can be used as the ammonium halide.

It is recommended to introduce additional halides of Group I-III metals into the charge at a mass ratio of ammonium halide to metal halide equal to 1:0.01-1, respectively.

An additional introduction into the charge of halides of the Group I-III metals as an additive provides the preparation of silicon α-nitride with a high caking ability.

To enhance the content of silicon α-nitride in the final product, it is expedient to introduce into the charge additionally amorphous silicon and/or silicon imide as silicon-reagent in amount of 5-95% of the mass of metallic silicon, the amounts of amorphous silicon and silicon imide in the case of simultaneous use thereof being within the range from identical to a 10-fold excess of one component with respect to the other.

The introduction of amorphous silicon, as well as of silicon imide, enhances the reactivity of silicon-reagent which ensures the accomplishment of synthesis in the combustion mode at a lower temperature.

The content of amorphous silicon and/or silicon imide less than 5% by mass does not ensure a high content of α-phase in the final product. The content of amorphous silicon and/or silicon imide more than 95% by mass is inexpedient since the yield of the final product does not increase further.

When amorphous silicon and silicon imide are used simultaneously, their mass ratio from equal amounts to a 10-fold excess of one component with respect to the other is optimum.

To decrease the combustion temperature in the process of self-propagating high-temperature synthesis, it is expedient to carry out the process in the flow of the nitrating medium after silicon-reagent has reacted by 40-60%. This limit is optimum for accomplishment of self-propagating high-temperature synthesis in the flow of the nitrating medium.

It is expedient to use ammonia, nitrogen, nitrogen in a mixture with 1-30 vol. % ammonia, hydrogen, halide, hydrogen halide, and argon separately or in combinations with one another as a nitrating medium.

Self-propagating high-temperature synthesis can be accomplished with liquid nitrogen as a nitrating medium.

It is recommended, in order to enhance the yield of the final product, to subject metallic silicon to preliminary chemical or physical action. As a result, the reactivity of silicon increases. It also allows one to perform synthesis at lower temperature.

Metallic silicon can be preliminary treated with hydrofluoric acid. The treatment is carried out in a fluoroplastic vessel with the use of diluted hydrofluoric acid upon stirring.

Metallic silicon can also be preliminary treated with ultrasound, shock-wave effect, or vibration dispersion by following the traditional procedures.

Treatment of metallic silicon with ultrasound in the action of an ultrasound field on powderous silicon.

Treatment by a shock-wave effect consists in the action of a shock wave generated by the explosion of an explosive substance on an indestructible capsule containing powderous silicon.

Treatment of metallic silicon by vibration dispersion resides in screening a silicon powder through the layer of vibrating balls in a crusher of the desintegrator type.

The proposed method of preparing silicon nitride with a high α-phase content ensures the preparation of the final product with the content of α-phase up to 95% having a good caking ability and low shrinkage upon caking.

The proposed method does not require complex equipment, scarce raw material, and great energy consumption. The initial electric power for initiation of the chemical reaction in a charge layer with an electric pulse is negligibly small.

DETAILED DESCRIPTION OF THE INVENTION

The method of preparing silicon nitride with a high α-phase content is technologically simple and is realized in the following way.

A charge is prepared by mixing the initial components in a ball mill for 20 min.

A powder of metallic silicon with a dispersity of 10 mkm and ammonium halide or a mixture of ammonium halides are mixed in the ball mill.

The obtained charge is loaded into a reactor onto a high-temperature porous substrate. The reactor represents a high pressure vessel made of stainless steel with a water jacket for cooling.

The reactor is filled with gaseous ammonia or nitrogen, or nitrogen in a mixture with 1-30 vol. % of ammonia, hydrogen, halide, hydrogen halide, and argon used separately or in a combination with one another under a pressure of 4-30 MPa.

Then the initial initiation of the chemical reaction is carried out in a small layer of the charge. For this purpose, a short pulse (5-10 s) of 20-50 V electric current (30-70 A) is delivered to an electric coil made of tungsten wire 25 mm in diameter. A hot coil heats the charge layer in contact up to high temperature at which the interaction of silicon with nitrogen begins and then the chemical reaction propagates in the charge in a layer-by-layer combustion mode at a propagation rate of the combustion wave 0.5-2 mm/s in the given system (depending on the composition of the charge and nitrating medium).

The additives are gasified in the combustion front which favours, on the one hand, a decrease of the combustion temperature and, on the other hand, the formation of the intermediate reaction products producing silicon α-nitride in the combustion zone. After the completion of the synthesis and cooling the reactor, the pressure in the reactor is released and the final product is discharged in the form of a cake. The outer layer of the cake is cleaned from the products of incomplete burning.

When amorphous silicon and/or silicon imide and halides of Group I-III metal are used, they are introduced into the charge at the stage of preparing thereof upon mixing the initial components in a ball mill.

Self-propagating high-temperature synthesis of silicon nitride in a nitrating medium flow is accomplished as follows.

The prepared charge is loaded into the reactor, the reactor is filled with a nitrating gas under a pressure of 4-30 MPa, and the reaction is initiated with an electric pulse as described above. After 40-60% of silicon-reagent has reacted, i.e. the reaction is almost half completed, the nitrating gas begins to be blown-off at a chosen flow rate.

The combustion reaction process is controlled by the reaction time which can be calculated by the known rate of combustion in the given system. Optimum flow rate of the nitrating medium is 4-8 l/min.

After completion of the synthesis and cooling the reactor, the pressure is released to atmospheric and the final product is discharged.

If liquid nitrogen is used as a nitrating medium, the combustion reaction proceeds under nitrogen pressure arising in the charge pores due to a high temperature because of the exothermal effect of the reaction.

The process is accomplished in the following way.

The prepared charge is placed onto a high-temperature substrate and loaded into a reactor made as a Dewar flask. Then the reactor is filled with liquid nitrogen and the chemical reaction is initiated with an electric pulse.

After the completion of the reaction and cooling the reactor, the latter is opened and the final product is discharged.

For a better understanding of the present invention, specific examples are given hereinbelow by way of illustration.

The content of α-phase in silicon nitride was determined by X-ray analysis and the content of free silicon by chemical analysis (by volumetric determination of hydrogen displaced from an alkali solution by silicon).

EXAMPLE 1

A charge is prepared from a powder of metallic silicon and an additive of ammonium fluoride in amounts of 60% by mass of the silicon mass.

To prepare a charge, 3,000 g metallic silicon and 1,800 g ammonium fluoride are mixed in a ball mill within a time period of 20 min. The charge thus obtained is loaded into a reactor onto a porous high-temperature substrate. The reactor is filled with gaseous nitrogen under a pressure of 10 MPa. The chemical reaction is initiated by delivering for 5-10 s an electric pulse (30-70 A, 20-50 V) to an electric coil made of a tungsten wire 25 mm in diameter. The hot coil heats the charge layer in contact up to the temperature at which the interaction of silicon with nitrogen with heat liberation begins. Then the chemical reaction proceeds in a self-propagating mode of layer-by-layer combustion. After the completion of the combustion reaction and cooling the reactor, the pressure in the reactor is released to atmospheric and the final product is discharged. The outer layer is cleaned from the products of incomplete combustion. The content of α-phase in silicon nitride is 88% by mass and the content of free silicon is 1% by mass.

EXAMPLE 2

A charge is prepared from 95% by mass of metallic silicon and 5% by mass of amorphous silicon with an additive taken in amount 60% of silicon-reagent. Ammonium fluoride is used as the additive.

The charge prepared by mixing the components is loaded into a reactor which is filled with nitrogen up to a pressure of 10 MPa and the chemical reaction is initiated. Then the process is carried out as described in Example 1.

The content of α-phase in silicon nitride is 89% by mass, the content of free silicon is 0.2% by mass.

EXAMPLE 3

A charge is prepared from 95% by mass of metallic silicon and 5% by mass of silicon imide with an additive taken in amount 40% of the mass of silicon-reagent. A mixture of ammonium fluoride and chloride at a mass ratio 1:1 is used as the additive. Aluminium fluoride and a mixture of ammonium halides at a mass ratio 1:0.01 are also used as an additive.

The charge prepared by mixing the powders of metallic silicon, silicon imide, ammonium fluoride, ammonium chloride and aluminium fluoride is loaded into a reactor, the reactor is filled with nitrogen under a pressure of 15 MPa, and then the process is performed by following the procedure described in Example 1.

The content of α-phase in silicon nitride is 93% by mass and the content of free silicon is 0.07% by mass.

EXAMPLE 4

A charge is prepared from 5% by mass of metallic silicon and 95% by mass of amorphous silicon with an additive in amount of 1% of the mass of silicon-reagent. A mixture of ammonium fluoride and chloride at a mass ratio thereof equal to 1:1 is used as the additive.

The charge obtained by mixing the powders of metallic silicon, amorphous silicon, ammonium fluoride and ammonium chloride is loaded into the reactor. The reactor is filled with nitrogen in a mixture with 30 vol. % of argon under a pressure of 30 MPa. Then the process is carried out by following the procedure described in Example 1.

The content of α-phase in silicon nitride is 88% by mass and that of free silicon is 1% by mass.

EXAMPLE 5

A charge is prepared by mixing 45% by mass of metallic silicon, 50% by mass of amorphous silicon and 5% by mass of silicon imide with an additive taken in amount of 40% of the mass of silicon-reagent. As the additive use is made of ammonium fluoride and chloride at a mass ratio thereof 1:0.1.

The obtained charge is loaded into a reactor and the reactor is filled with nitrogen in a mixture with 10 vol. % of ammonia under a pressure of 12 MPa. Then the process is performed as described in Example 1.

The content of α-phase in silicon nitride is 95% by mass and that of free silicon is 0.15% by mass.

EXAMPLE 6

A charge is prepared from 45% by mass of metallic silicon, 5% by mass of amorphous silicon, 50% by mass of silicon imide with an additive taken in amount of 5% of the silicon-reagent mass. As the additive use is made of a mixture of ammonium fluoride and chloride at a mass ratio thereof equal to 2:1. Sodium fluoride is also used as an additive at a mass ratio ammonium halides: sodium fluoride equal to 1:0.1. The prepared charge is loaded into a reactor, the reactor is filled with nitrogen in a mixture with 5 vol. % of hydrogen under a pressure of 10 MPa. Then the process is carried out by following the procedure described in Example 1.

The content of α-phase in silicon nitride is 95% by mass and of free silicon is 0.06% by mass.

EXAMPLE 7

A charge is prepared from 90% by mass of metallic silicon, 10% by mass of amorphous silicon, and an additive taken in amount of 25% of the silicon-reagent mass. As the additive use is made of a mixture of ammonium fluoride and chloride at a mass ratio thereof 1:1.

The prepared charge is loaded into a reactor and the reactor is filled with nitrogen under a pressure of 4 MPa; then the chemical reaction is initiated.

After the combustion front propagates by 40% in the charge, i.e. in 15 min after the beginning of combustion, the reactor is blown-off with nitrogen at a flow rate of 6 1/min. After the completion of the combustion process, the procedure described in Example 1 is followed.

The content of α-phase in silicon nitride is 94% by mass and of free silicon is 0.1% by mass.

EXAMPLE 8

A charge with the composition similar to that described in Example 7 is prepared and loaded into a reactor. The reactor is filled with nitrogen under a pressure of 4 MPa and the chemical reaction is initiated.

After the propagation of the combustion front in the charge by 60%, i.e. in 20 min after the beginning of the combustion, the reactor is blown-off with nitrogen at a flow rate of 6 1/min. After the completion of the combustion process, the procedure described in Example 1 is followed.

The content of α-phase in silicon nitride is 94% by mass and that of free silicon, 0.15% by mass.

EXAMPLE 9

A charge is prepared from 95% by mass of metallic silicon, 2.5% by mass of amorphous silicon, 2.5% by mass of silicon imide, and an additive in amount of 30% of the mass of silicon-reagent. A mixture of ammonium fluoride and chloride at a mass ratio thereof equal to 10:1 is used as the additive.

The prepared charge is loaded into a reactor, the reactor is filled with nitrogen in a mixture with 10 vol. % of hydrogen chloride under a pressure of 20 MPa, and then the process is performed by following the procedure described in Example 1.

The content of α-phase in silicon nitride is 93% by mass and of free silicon, 0.07% by mass.

EXAMPLE 10

A charge is prepared from 70% by mass of metallic silicon, 30% by mass of amorphous silicon, and an additive taken in amount of 30% of the mass of silicon-reagent. As the additive use is made of a mixture of ammonium fluoride, chloride and iodide at a mass ratio thereof equal to 1:1:1.

The prepared charge is loaded into a reactor and the reactor is filled with nitrogen under a pressure of 15 MPa. Then, follows the procedure described in Example 1.

The content of α-phase in silicon nitride is 95% by mass and of free silicon, 0.07% by mass.

EXAMPLE 11

A charge is prepared from 50% by mass of metallic silicon, 50% by mass of amorphous silicon, and an additive in amount of 20% of the mass of silicon-reagent. A mixture of ammonium fluoride and chloride is used as the additive at a mass ratio thereof equal to 1:1. Magnesium fluoride at a mass ratio of ammonium halides: magnesium fluoride equal to 1:0.1 is also used as the additive.

The obtained charge is loaded into a reactor, and the reactor is filled with ammonia under a pressure of 8 MPa. Then the process is performed by following the procedure described in Example 1.

The content of α-phase in silicon nitride is 95% by mass and of free silicon, 0.06% by mass.

EXAMPLE 12

A charge is prepared from 60% by mass of metallic silicon, 40% by mass of amorphous silicon, and an additive in amount of 15% of the mass of silicon-reagent. As the additive use is made of a mixture of ammonium chloride and fluoride at a mass ratio thereof equal to 1:1.

The prepared charge is loaded into a reactor, and the reactor is filled with nitrogen in a mixture with 5 vol. % of hydrogen and 20 vol. % of argon under a pressure of 20 MPa. Then the process is carried out by following the procedure described in Example 1.

The content of $\alpha$-phase in silicon nitride is 93% by mass and of free silicon, 0.15% by mass.

EXAMPLE 13

A charge is prepared from 70% by mass of metallic silicon, 30% by mass of amorphous silicon, and an additive in amount of 35% of the mass of silicon-reagent. As the additive use is made of a mixture of ammonium fluoride and calcium fluoride at a mass ratio thereof equal to 1:0.1.

The prepared charge is loaded into a reactor, the reactor is filled with nitrogen in a mixture with 1 vol. % of chloride under a pressure of 15 MPa, and then the process is carried out as described in Example 1.

The content of $\alpha$-phase in silicon nitride is 94% by mass and of free silicon, 0.06% by mass.

EXAMPLE 14

A charge is prepared from 80% by mass of metallic silicon and 20% by mass of amorphous silicon with an additive in amount of 35% of the mass of silicon-reagent. As the additive use is made of a mixture of ammonium fluoride and chloride at a mass ratio thereof equal to 1:1.

The prepared charge is loaded into a reactor, and the reactor is filled with liquid nitrogen. Then the chemical reaction in a charge layer is initiated with an electric pulse by following the procedure described in Example 1. A nitrogen pressure up to 30 MPa is generated in the charge pores because of a high temperature caused by the exothermal effect of the reaction and then the reaction propagates in the charge in a self-propagating combustion mode.

After the completion of the combustion process, the reaction product is discharged.

The content of $\alpha$-phase in silicon nitride is 90% by mass and of free silicon, 0.1% by mass.

EXAMPLE 15

A charge is prepared from 80% by mass of metallic silicon treated with fluoric acid, 20% by mass of amorphous silicon, and an additive in amount of 35% of the mass of silicon-reagent. As the additive use is made of a mixture of ammonium chloride and iodide at a mass ratio thereof equal to 10:1.

The prepared charge is loaded into a reactor, and the reactor is filled with nitrogen under a pressure of 15 MPa. Then the process is performed as described in Example 1.

The content of $\alpha$-phase in silicon nitride is 91% by mass and of free silicon, 0.1% by mass.

EXAMPLE 16

A charge is prepared from 80% by mass of metallic silicon treated by the shock-wave effect, 20% by mass of amorphous silicon, and an additive in amount of 35% of the mass of silicon-reagent. As the additive use is made of a mixture of ammonium fluoride and iodide at a mass ratio thereof equal to 10:1, respectively.

The prepared charge is loaded into a reactor, and then the process is carried out as described in Example 1.

The content of $\alpha$-phase in silicon nitride is 91% by mass and of free silicon, 0.15% by mass.

EXAMPLE 17

A charge is prepared from 80% by mass of metallic silicon treated with ultrasound, 20% by mass of amorphous silicon, and an additive in amount of 35% of the mass of silicon-reagent. Ammonium chloride is used as the additive.

The prepared charge is loaded into a reactor, and the reactor is filled with nitrogen in a mixture with 5 vol. % of hydrogen under a pressure of 15 MPa. Then the process is carried out as described in Example 1.

The content of $\alpha$-phase in silicon nitride is 92% by mass and of free silicon, 0.1% by mass.

EXAMPLE 18

A charge is prepared from 80% by mass of metallic silicon treated in a vibrating crusher by vibration dispersion and 20% by mass of amorphous silicon with an additive in amount of 35% of the mass of silicon-reagent. Ammonium fluoride is used as the additive.

The prepared charge is loaded into a reactor, the reactor is filled with nitrogen in a mixture with 5 vol. % of HCl under a pressure of 15 MPa. Then the process is carried out as described in Example 1.

The content of $\alpha$-phase in silicon nitride is 92% by mass and of free silicon, 0.08% by mass.

EXAMPLE 19

A charge is prepared from 5% by mass of metallic silicon, 50% by mass of amorphous silicon, 45% by mass of silicon imide, and an additive of ammonium fluoride in amount of 5% of the mass of silicon-reagent.

The prepared charge is loaded into a reactor, and the reactor is filled with nitrogen under a pressure of 15 MPa. Then the process is carried out as described in Example 1.

The content of $\alpha$-phase in silicon nitride is 95% by mass and of free silicon, 0.05% by mass.

INDUSTRIAL APPLICABILITY

The proposed method of preparing silicon nitride with a high alpha-phase content may find application in powder metallurgy for manufacturing construction high-temperature ceramics (for instance, engine parts), instrumental ceramics, antifriction and special materials possessing a high electric strength and stability of dielectric characteristics.

We claim:

1. In a self-propagating high-temperature synthesis for preparing silicon nitride from a charge containing a silicon reagent, the improvement comprising employing metallic silicon as the silicon reagent, contacting the metallic silicon with 1–60% of at least one ammonium halide based on the mass of the metallic silicon in a nitrating medium at a pressure of 4–30 MPa.

2. The method of claim 1 wherein the charge further comprises amorphous silicon, silicon imide or combination thereof in an amount of 5–95% based on the mass of the metallic silicon.

3. The method of claim 1 wherein the charge contains amorphous silicon and silicon imide in amounts such that the weight of one does not exceed ten times the weight of the other.

4. The method of claim 1 wherein the charge further comprises a halide of a Group I-III metal at a mass ratio of ammonium halide to said Group I-III metal halide in the range of 1:0.01-1.

5. The method of claim 1 comprising conducting the reaction in a flow of the nitrating medium after the consumption of 40-60% of the silicon reagent.

6. The method of claim 1 wherein the nitrating medium is ammonia.

7. The method of claim 1 wherein the nitrating medium is nitrogen.

8. The method of claim 7 wherein the nitrating medium includes 1-30 volume % of at least one substance selected from the group consisting of ammonia, hydrogen, halide, hydrogen halide and argon.

9. The method of claim 7 wherein the nitrogen is liq nitrogen.

10. The method of claim 1 further comprising activating the metallic silicon by reaction with hydrofluoric acid prior to contacting the metallic silicon with the ammonium halide.

11. The method of claim 1 comprising activating the metallic silicon with ultrasound prior to contacting the metallic silicon with the ammonium halide.

12. The method of claim 1 comprising activating the metallic silicon by a shock-wave effect prior to contacting the metallic silicon with the ammonium halide.

13. The method of claim 1 comprising activating the metallic silicon by vibration dispersion prior to contacting the metallic silicon with the ammonium halide.

* * * * *